United States Patent [19]
Weng et al.

[11] Patent Number: 5,595,077
[45] Date of Patent: Jan. 21, 1997

[54] STEERING LOCK

[76] Inventors: Tian-Tsair Weng, No.49-1, Chung-Lung Chun, An-Ting Hsiang; Yang-Hui Cheng, No. 94, Kang Chih Wei, Kang-Wei Chun, An-Ting Hsiang, both of Tainan Hsien, Taiwan

[21] Appl. No.: 435,225

[22] Filed: May 5, 1995

[51] Int. Cl.$^6$ .................................................. B60R 25/02
[52] U.S. Cl. ............................................. 70/209; 70/226
[58] Field of Search .......................... 70/209–212, 225, 70/226, 237, 238

[56] References Cited

U.S. PATENT DOCUMENTS

| | | | |
|---|---|---|---|
| 4,829,797 | 5/1989 | Wu | 70/209 |
| 4,882,920 | 11/1989 | Wu | 70/209 |
| 5,055,823 | 10/1991 | Fuller | 70/209 X |
| 5,129,245 | 7/1992 | Chang | 70/209 |
| 5,168,732 | 12/1992 | Chen et al. | 70/209 |
| 5,347,836 | 9/1994 | Chen | 70/209 |
| 5,400,627 | 3/1995 | Liao | 70/209 |
| 5,428,976 | 7/1995 | Weng et al. | 70/209 |
| 5,452,597 | 9/1995 | Chen | 70/209 |
| 5,454,242 | 10/1995 | Su | 70/209 |
| 5,469,135 | 11/1995 | Solow | 70/209 X |

*Primary Examiner*—Suzanne L. Dino
*Attorney, Agent, or Firm*—Varndell Legal Group

[57] ABSTRACT

A steering lock including a lock body having a transverse half-round recess in the middle and a longitudinal sliding track at the top, a protective cushion mounted within the half-round recess and attached to the bottom side of the periphery of the steering wheel, an adjustment cushion having one end attached to a bottom groove on the protective cushion and retained to a rectangular slot thereof and an opposite end flanged and covered over the periphery of the steering wheel, a slide inserted into the longitudinal sliding track of the lock body, a hollow top cover fixed to the slide to hold an audio alarm circuit, and a stop bar having one end fixed to the lock body to hold the slide in position and an opposite end stopped at the instrument board of the motor vehicle to hold the steering lock in place.

1 Claim, 5 Drawing Sheets

STEERING LOCK

BACKGROUND OF THE INVENTION

The present invention relates to steering locks, and relates more particularly to such a steering lock which has an audio alarm circuit that produces an audio alarm signal when the steering lock is moved from the steering wheel by force.

Various steering locks have been developed for use to lock the steering wheel of a motor vehicle. Exemplars of these steering locks are seen in U.S. Pat. No. 5,168,732 (see FIG. 2) and U.S. Pat. No. 5,428,976 (see FIG. 3). The steering lock of U.S. Pat. No. 5,168,732 comprises a lock body and a lock bar pivoted to the lock body. The lock bar is turned away from the steering wheel mounting chamber on the lock body for permitting the lock body to be attached to the periphery of the steering wheel, then the lock bar is turned back and bridged over the periphery of the steering wheel and then locked in position to hold down the steering lock in position. This structure of steering lock is inconvenient to operate in the limited inside space of the motor vehicle. Furthermore, because the steering wheel mounting chamber is not adjustable subject to the thickness of the periphery of the steering wheel, the steering lock tends to slip on the periphery of the steering wheel when locked. FIG. 1 shows another structure of steering wheel according to the prior art. However, this structure of steering wheel is still not satisfactory in function. By inserting a lever into the elongated top track on the lock body of this structure of steering wheel, the locking mechanism can be easily destroyed to let the steering lock be removed from the steering wheel. Furthermore, regular steering wheels are commonly heavy and can be destroyed by tools easily.

SUMMARY OF THE INVENTION

According to one aspect of the present invention, the steering lock is comprised of a lock body, a slide fixed with a hollow top cover and then fastened to the lock body to hold the lock body to the steering wheel, a stop bar fixed to the lock body and stopped at the instrument board of the motor vehicle to hold the slide in position, and an audio alarm circuit mounted within the hollow top cover to provide an audio alarm signal when the steering lock is moved from the steering wheel by force.

According to another aspect of the present invention, the lock body has a hole aligned with a through hole on the slide for holding the speaker of the audio alarm circuit.

According to still another aspect of the present invention, a protective cushion is mounted within a half-round recess on the lock body and defining a top chamber to receive the periphery of the steering wheel, and an adjustment cushion is secured to the protective cushion and bridged over the periphery of the steering wheel and pressed by the slide to stop the steering wheel from movement relative to the steering lock. Because of the arrangement of the adjustment cushion, the steering lock fits any of a variety of steering wheels.

DETAILED DESCRIPTION OF THE PREFERRED EMBODIMENT

Figure 1:
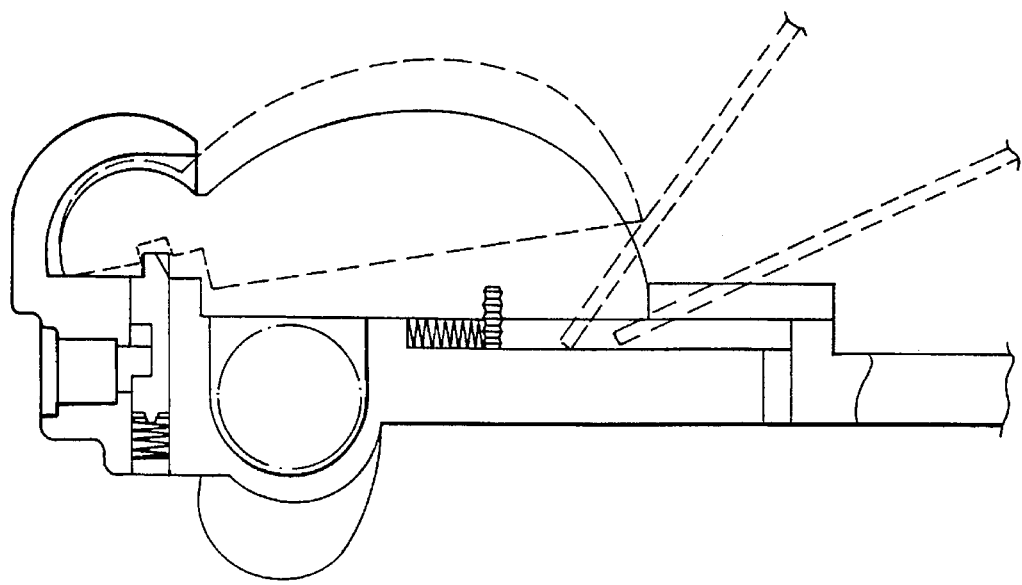
FIG. 1 is a side view in section of a steering lock according to the prior art.
Figure 2:
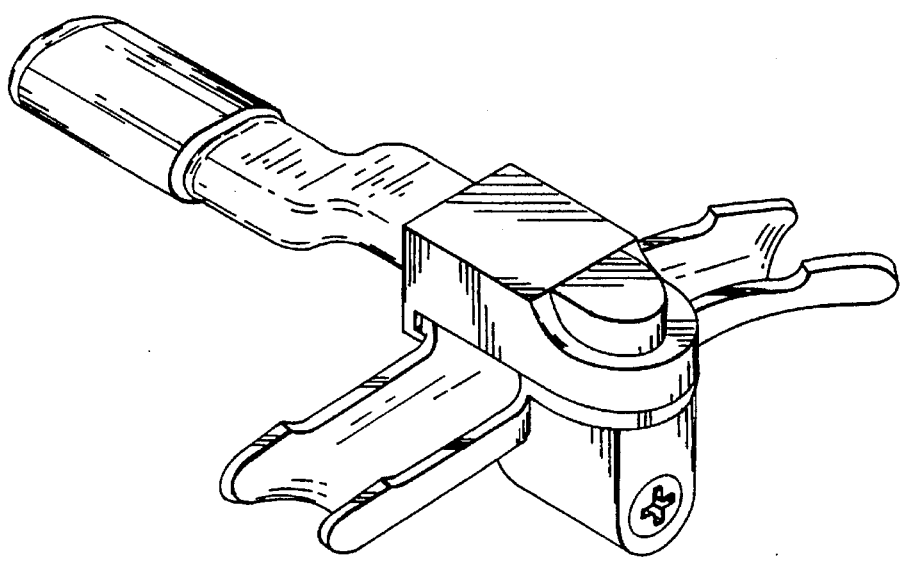
FIG. 2 is an elevational view of a steering lock according to U.S. Pat. No. 5,168,732.
Figure 3:
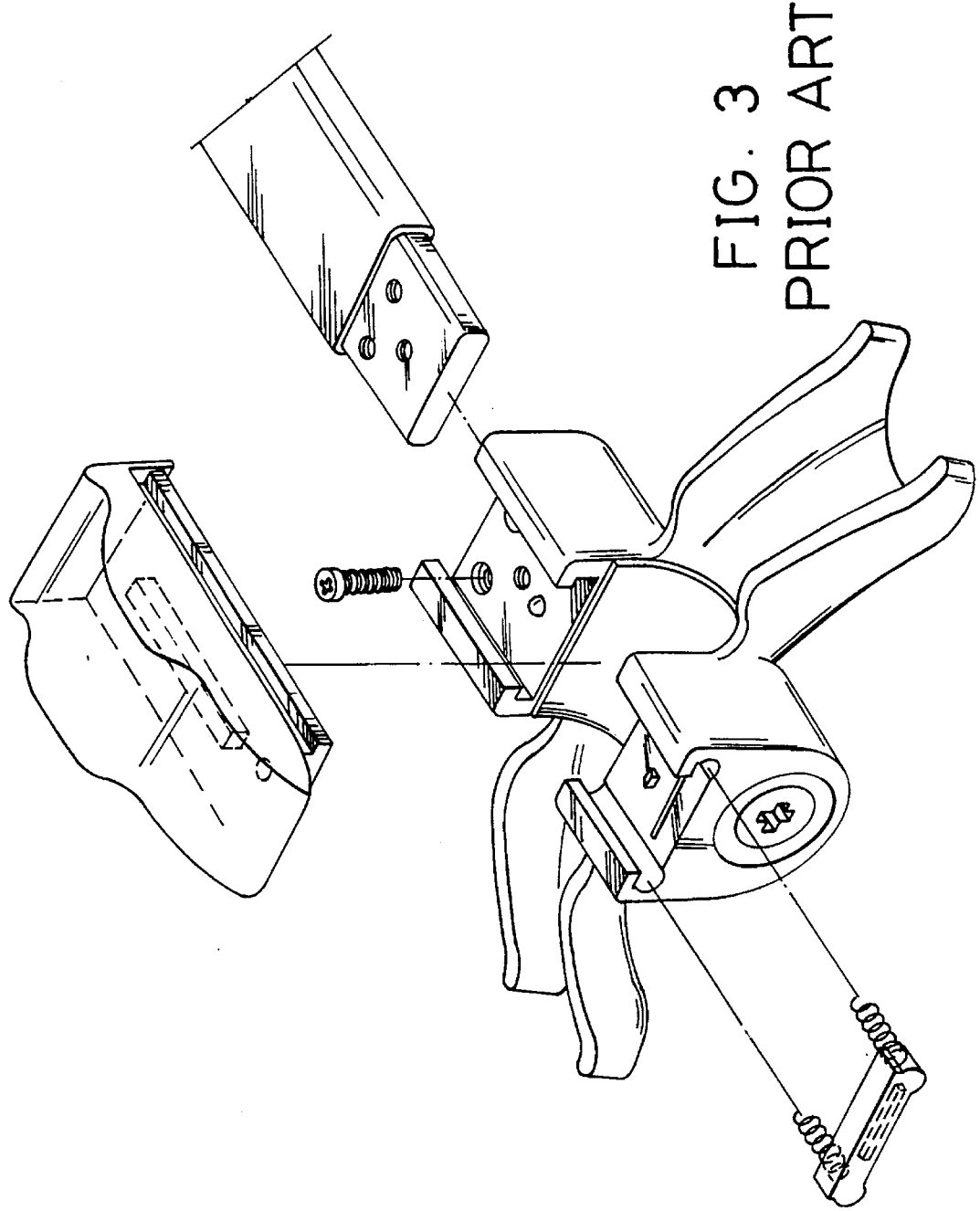
FIG. 3 is an exploded view of a steering lock according to U.S. Pat. No. 5,428,976.
Figure 4:
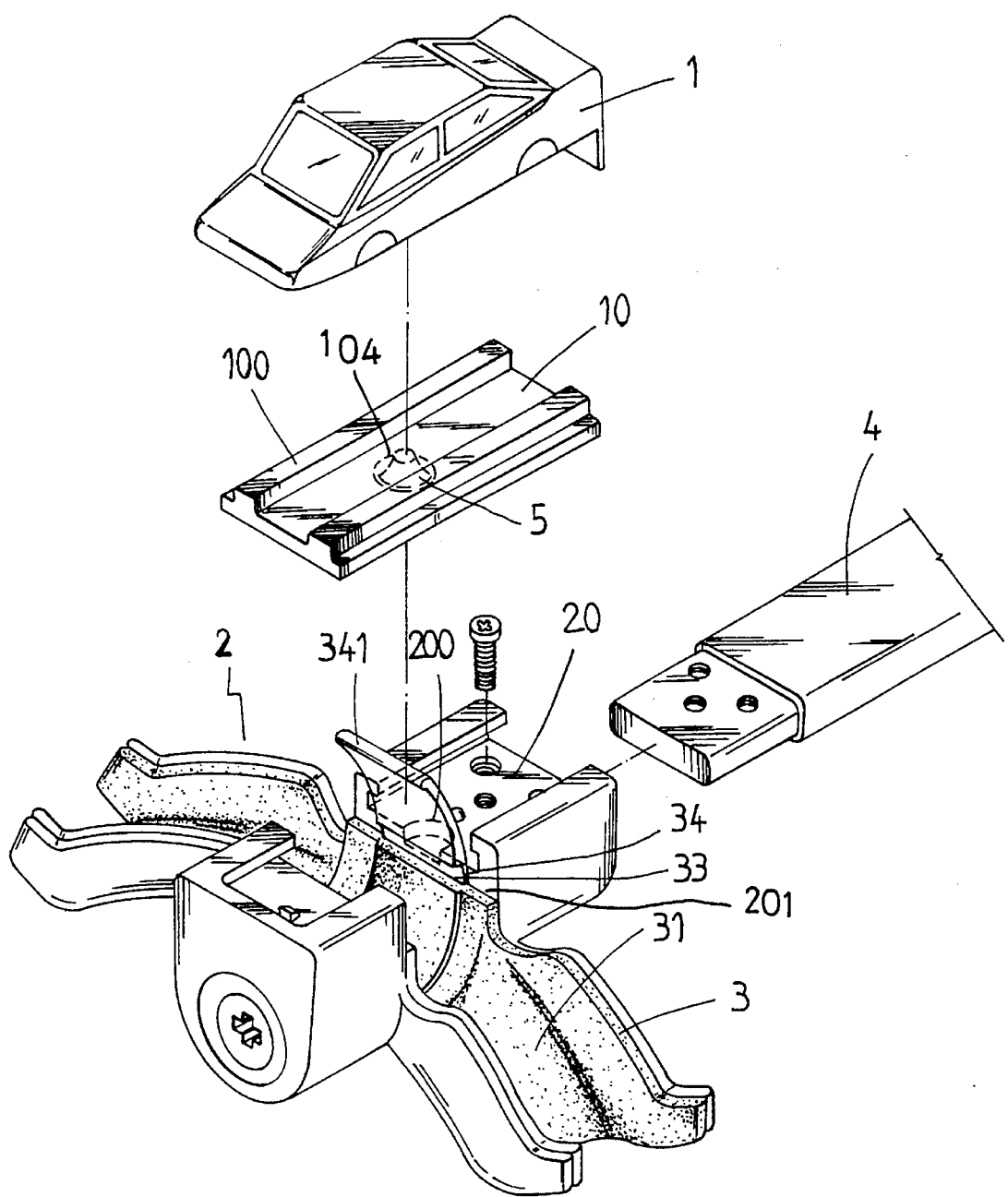
FIG. 4 is an exploded view of a steering lock according to the present invention.
Figure 5:
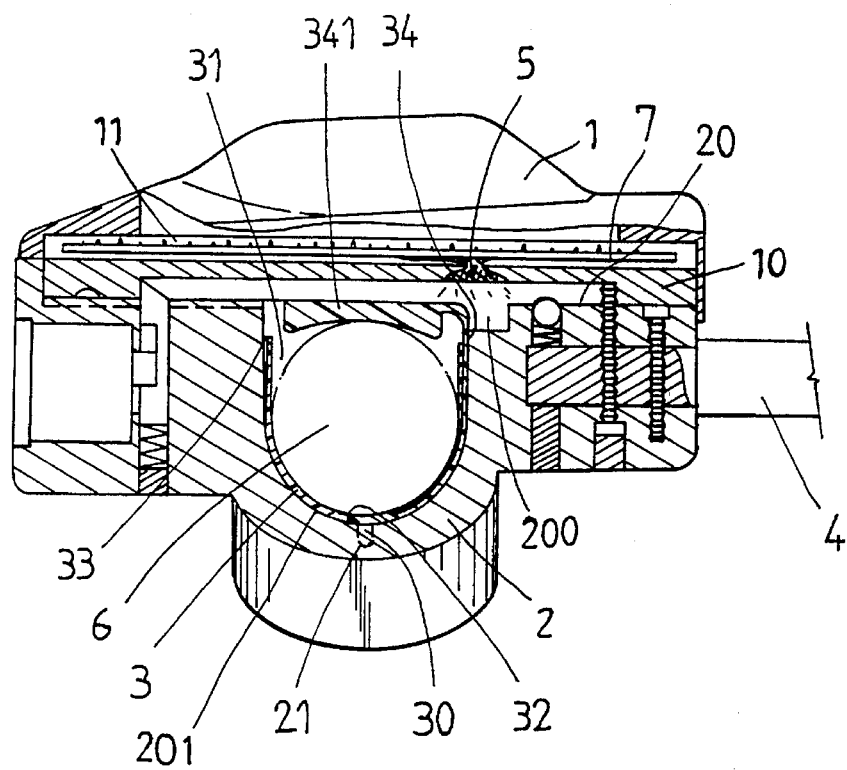
FIG. 5 is an installed view in section of the steering lock shown in FIG. 4.
Figure 8:
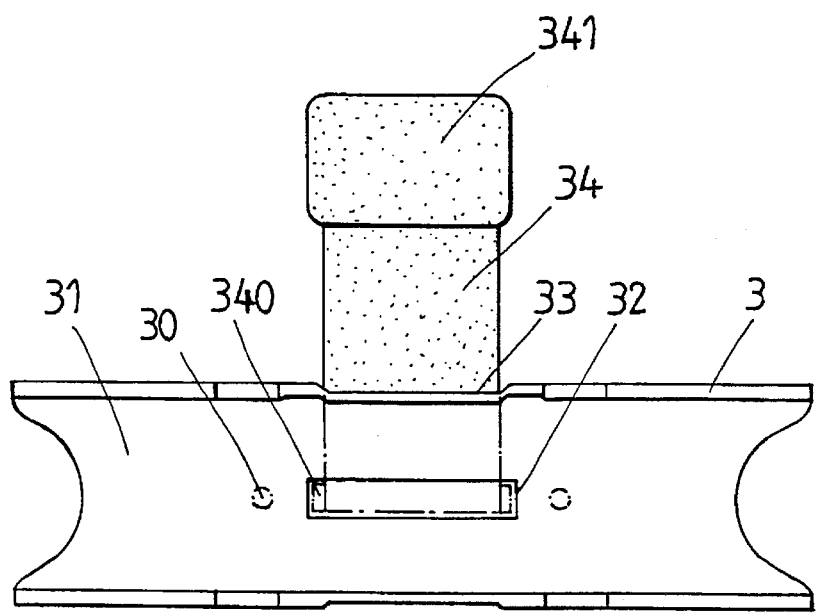
FIG. 8 is a top plain view of the protective cushion and the adjustment cushion according to the present invention.

Referring to FIGS. 4 and 5, a steering lock in accordance with the present invention is generally comprised of a top cover 1, a slide 10, a lock body 2, a protective cushion 3, and an adjustment cushion 34, and a stop bar 4. The top cover 1 is made of hollow structure covered on the slide 10 to hold an audio alarm circuit device 7 on the inside. The slide 10 has two parallel rails 100 longitudinally disposed at the top side, pairs of countersunk holes 101 disposed at the bottom side corresponding to the parallel rails 100 and terminating in a respective screw hole 102, and a center through hole 104, which receives the speaker, referenced by 5, of the audio alarm circuit 7. The lock body 2 comprises a half-round recess 201 transversely disposed in the middle, two locating holes 21 on the half-round recess 201, a longitudinal sliding track 20 at the top side, which receives the slide 10, and a hole 200 on the sliding track 20. The protective cushion 3 is mounted on the half-round recess 201, having two bottom pins 30 respectively fitted into the locating holes 21 on the lock body 2, a top chamber 31 fitting over the steering wheel 6 (see FIG. 5), a rectangular slot 32 longitudinally disposed in the middle of the top chamber 31 (see FIG. 8), a back groove 33 disposed at the back side in the middle. The adjustment cushion 34 fits the back groove 33 of the protective cushion 3, having a coupling portion 340 at one end fastened to the rectangular slot 32 and a flanged portion 341 at an opposite end. The stop bar 4 is fixedly secured to the lock body 2 and stopped at the instrument board of the motor vehicle to hold down the steering lock.

Figure 6:
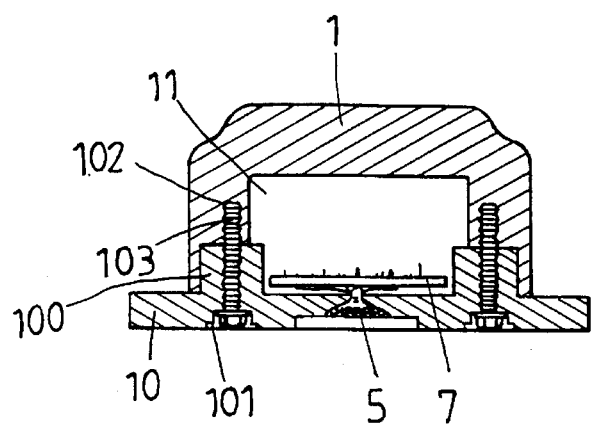
FIG. 6 is a sectional view showing the top cover and the slide fastened together according to the present invention.

Referring to FIGS. 5 and 6, the slide 10 is fixed to the top cover 1 by screws 103 to hold the audio alarm circuit 7 in the space 11 defined within the top cover 1. When the slide 10 is inserted into the sliding track 20 of the lock body 2, the speaker 5 of the audio alarm circuit 7 is mounted within the hole 200 on the longitudinal track 20 of the lock body 2.

Figure 7:
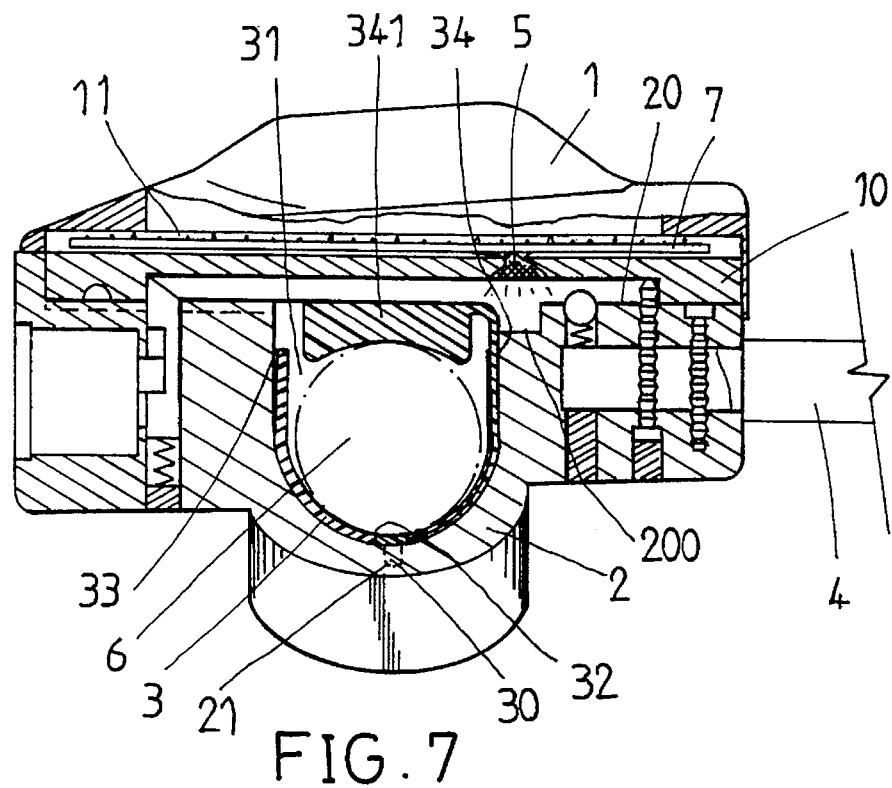
FIG. 7 is another installed view in section of the steering lock according to the present invention.

Referring to FIG. 7, when the top chamber 31 of the protective cushion 3 is attached to the steering wheel 6, the flanged portion 341 of the adjustment cushion 34 can be covered over the steering wheel 6 and adjusted to the best fit position subject to the thickness of the periphery of the steering wheel 6.

I claim:

1. A steering lock comprising:
   a lock body having a middle and a half-round recess transversely disposed in the middle for attaching to a steering wheel of a motor vehicle, two locating holes in said half-round recess, a longitudinal top sliding track, and a hole in said longitudinal top sliding track;
   a protective cushion mounted on said half-round recess for receiving a periphery of the steering wheel, said protective cushion comprising two bottom pins respectively fitted into the locating holes on said lock body, a top chamber, which receives the periphery of the steering wheel, a rectangular slot longitudinally disposed in a middle of said top chamber, a back groove disposed at a back side thereof and transversely extended from said rectangular slot;

an adjustment cushion fitting said back groove of said protective cushion, having a coupling portion at one end fastened to said rectangular slot and a flanged portion at an opposite end capable of covering the periphery of the steering wheel;

a slide inserted into said longitudinal top sliding track of said lock body to hold down the flange portion of said adjustment cushion on the periphery of the steering wheel, said slide comprising two parallel rails longitudinally disposed at a top side thereof, pairs of countersunk holes at a bottom side thereof respectively penetrated through said parallel rails and terminating in a respective screw hole, and a center through hole;

a hollow top cover covered on said slide and fixed to said countersunk holes by screws;

an audio alarm circuit mounted within said hollow top cover and supported on said slide, said audio alarm circuit comprising a speaker mounted within the center through hole on said slide and facing the hole on the longitudinal top sliding track of said lock body;

a stop bar having one end fixed to said lock body to hold said slide in position and an opposite end stoppable at an instrument board of the motor vehicle; and a lock mechanism mounted within the lock body for engaging the slide to lockably secure the steering lock to the steering wheel.

* * * * *